UNITED STATES PATENT OFFICE 2,688,021

BICYCLOHEPTENE AND BICYCLOOCTENE-2-CARBOXYLIC ACID ESTERS

William W. Jenkins, Morton Grove, Ill., assignor to G. D. Searle & Co., Chicago, Ill., a corporation of Illinois No Drawing. Application April 29, 1953, Serial No. 352,041

12 Claims. (Cl. 260—294.3)

The present application is a continuation-in-part of my copending application, Serial Number 249,005, filed September 29, 1951, now forfeited. It relates to a new group of basic esters of polycarbocyclic acids and, particularly, to the basic esters of bicyclo[2.2.1]-5-heptene-2-carboxylic acid and bicyclo[2.2.2] - 5 - octene-2-carboxylic acid, their salts, and the nuclearly alkylated substituents thereof. While this alkyl substitution may be at any of the nuclear carbon atoms, the 2- and 3- positions are preferred for the purposes of the present invention. The compounds with which this invention is particularly concerned are those of the general structural formula shown

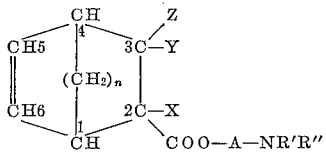

and their salts, wherein $n$ is one or two, X, Y, and Z are either hydrogen or lower alkyl radicals, A is a bivalent aliphatic hydrocarbon radical containing at least 2 carbon atoms and NR'R'' is a lower alkylamino radical, dialkylamino radical or a nitrogen-containing heterocyclic radical attached through a nitrogen in the heterocycle to the radical A.

In the foregoing structural formula the radicals X, Y, and Z can be hydrogen or such lower alkyl radicals as methyl, ethyl, and straight-chained and branch-chained propyl, butyl, amyl, and hexyl.

The radical A is derived from such straight or branch-chained aliphatic hydrocarbon radicals as ethylene, propylene, butylene, amylene, hexylene or polymethylene radicals such as trimethylene, tetramethylene, pentamethylene and hexamethylene.

The radicals R' and R'' can be lower alkyl groups. The radical NR'R'' can also be a nitrogen-containing lower heterocycle such as piperazine, N'-alkylpiperazine, thiamorpholine, quinoline, and isoquinoline, but of particular interest are the heterocyclic radicals of the type

wherein B is either an ethyleneoxyethylene radical, as in the case of the morpholino radical, or an alkylene chain containing 4 to 7 carbon atoms, 4 to 5 of which are in nuclear position, as in the case of pyrrolidine, piperidino, 2,5-dimethylpyrrolidino and 2,6-lupetidino radicals.

The organic bases described herein form salts non-toxic in therapeutic dosage with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The acids which constitute the starting materials for the invention are prepared by a Diels-Alder addition of a compound of the type

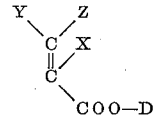

wherein D is a hydrogen or lower alkyl group, and X, Y, and Z are defined as hereinabove, to cyclopentadiene and cyclohexadiene, as shown by Alder et al., Annalen der Chemie, vol. 514, pages 197 et seq. 1934, Fiesselmann, Berichte deut. chem. Ges., vol. 75, pages 881 et seq., 1942 and Seka et al., ibid, pages 1379 et seq. Esterification is carried out in the conventional manner.

The esters which constitute the present invention are valuable as intermediates in organic synthesis. Thus organic azides can be caused to add across the 5,6-double bond to form compounds of the type

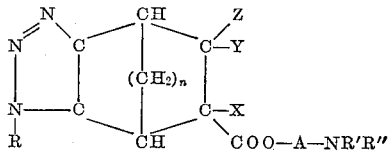

wherein R is an alkyl or aryl radical.

The claimed compounds are of special value as medicinal agents because of their action on blood pressure and their diuretic effect. The quaternary salts are of special interest because of their inhibitory effect on the transmission of nerve impulses in the autonomic nervous system. Certain of the quaternary ammonium salts are active ingredients in parasiticidal compositions of matter. It has also been found that the claimed compounds cause release of adrenocorticotrophic hormone from the pituitary gland.

My invention is disclosed in further detail by the following examples which are set forth for the purpose of illustrating this invention, but are in no way to be construed as limiting it in spirit or in scope. It will be apparent to those skilled in the art that many modifications in methods, conditions and materials can be adopted without departing therefrom. In these examples temperatures are given uncorrected in degrees centigrade (° C.), pressures during vacuum distillation in millimeters (mm.) of mercury, and quantities of materials in parts by weight.

EXAMPLE 1

*β-Diethylaminoethyl ester of bicyclo[2.2.1]-5-heptene-2-carboxylic acid*

A mixture of 270 parts of bicyclo[2.2.1]-5-heptene-2-carboxylic acid and 280 parts of β-chloroethyl-diethylamine in 800 parts of 2-propanol is heated at reflux temperature with stirring for 8 hours. A precipitate forms within a short time. After completion of the reaction, this precipitate is collected on a filter and the mother liquor concentrated to give an additional precipitate. The solid residues are combined, dissolved in water, washed with ether, rendered alkaline and extracted with ether. The ether extract is dried over anhydrous calcium sulfate, filtered and evaporated. The residue contains the β-diethylaminoethyl ester of bicyclo[2.2.1]-5-heptene-2-carboxylic acid which is distilled at about 94–96° C. and 0.2 mm. pressure.

119 parts of this base are dissolved in 3000 parts of anhydrous ether and treated with one equivalent of a 25% solution of hydrogen chloride in anhydrous ethanol. There is an immediate formation of a white precipitate. Recrystallized from anhydrous ethyl acetate the hydrochloride melts at about 137–138° C.

EXAMPLE 2

*Bicyclo[2.2.1]-5-heptene-2-carboxyethyl-diethylmethyl-ammonium bromide*

A mixture of 136 parts of the β-diethylaminoethyl ester of bicyclo[2.2.1] - 5 - heptene - 2 - carboxylic acid and 95 parts of methyl bromide in 240 parts of butanone is sealed in a pressure reactor and, after standing for several days at room temperature, poured into 3000 parts of anhydrous ether. The bicyclo[2.2.1]-5-heptene-2-carboxyethyldiethylmethylammonium bromide crystallizes and is collected on a filter and dried. The hygroscopic crystals melt at about 100–102° C. The compound has the structural formula

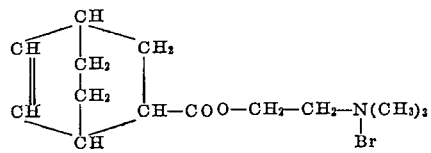

EXAMPLE 3

*β-Dimethylaminoethyl ester of bicyclo[2.2.2]-5-octene-2-carboxylic acid*

A mixture of 500 parts of freshly distilled cyclohexadiene, 800 parts of methyl acrylate and a small amount of hydroquinone are placed into a bomb and heated at 160–170° for 12 hours. After cooling the contents are removed with ether and the resulting solution is refluxed for 10 hours with a solution of 825 parts of potassium hydroxide in 830 parts of water and 2400 parts of methanol. The solvent is stripped under vacuum and the residue is dissolved in water, washed with ether, made acidic with dilute hydrochloric acid and extracted with ether. The extract is washed with water, dried over anhydrous calcium chloride, filtered and evaporated to yield the bicyclo-[2.2.2]-5-octene-2-carboxylic acid which is distilled at about 108–112° C. and 0.2 mm. pressure.

A mixture of 325 parts of this acid, 297 parts of thionyl chloride and 2 parts of pyridine in 1700 parts of benzene is refluxed for 90 minutes, cooled and filtered with filter aid. The filtrate containing the bicyclo-[2.2.2]-5-octene-2-carbonyl chloride is diluted with 2700 parts of benzene and mixed with 288 parts of β-dimethylaminoethanol. After refluxing for 3.5 hours the solvent is removed under vacuum and the residue is dissolved in water, washed with ether, made alkaline and extracted with ether. This extract is washed with water, dried over anhydrous calcium sulfate, filtered and evaporated to yield the β-dimethylaminoethyl ester of bicyclo-[2.2.2]-5-octene-2-carboxylic acid which is distilled at about 89–91° C. and 0.3 mm. pressure.

An ether solution of this base is treated with one equivalent of a 25% solution of hydrogen chloride in absolute 2-propanol. A copious white precipitate forms at once. The latter is collected on a filter and recrystallized from absolute ethyl acetate by addition of a small amount of 2-propanol. The hydrochloride melts at about 163–165° C.

EXAMPLE 4

*Bicyclo[2.2.2]-5-octene-2-carboxyethyltrimethylammonium bromide*

A solution of 111 parts of β-dimethylaminoethyl ester of bicyclo[2.2.2]-5-octene-2-carboxylic acid and 87 parts of methyl bromide in 240 parts of butanone is maintained in a sealed reactor until the contents set to a solid white precipitate. The contents are then mixed with ether and the bicyclo[2.2.2] - 5 - octene - 2 - carboxyethyltrimethylammonium bromide is collected on a filter. Recrystallized from a mixture of 2-propanol and ethyl acetate it melts at about 220–222° C. with decomposition. This salt has the structural formula

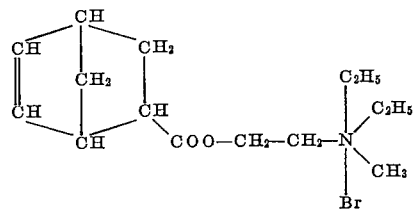

EXAMPLE 5

*β-Pyrrolidinoethyl ester of bicyclo[2.2.2]-5-octene-2-carboxylic acid*

A benzene solution of bicyclo[2.2.2]-5-octene-2-carbonyl chloride, obtained as in Example 3 from 325 parts of the acid, is mixed with 372 parts of N-(β-hydroxyethyl)-pyrrolidine and, after subsidence of the initial exothermic reaction, the mixture is refluxed for 4 hours and then concentrated under vacuum. The residue is dissolved in water, washed with ether, treated with sodium hydroxide to alkalinity and then extracted with ether. This ether extract is washed with water, dried over anhydrous calcium sulfate, filtered and evaporated to yield the β-pyrrolidinoethyl ester of bicyclo[2.2.2]-5-octene-2-carboxylic acid which is distilled at about 100–110° C. and 0.1–0.3 mm. pressure. It has the structural formula

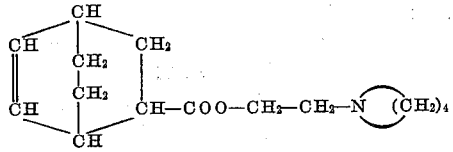

EXAMPLE 6

*β-Diethylaminoethyl ester of 2-methyl-bicyclo-[2.2.1]-5-heptene-2-carboxylic acid*

A mixture of 200 parts of 2-methyl-bicyclo-[2.2.1]-5-heptene-2-carboxylic acid and 180 parts of β-chloroethyldiethylamine in 800 parts of 2-propanol is heated at reflux temperature with stirring for 7 hours. The solvent is partially removed by evaporation and the precipitate dissolved in water. After washing with ether the aqueous solution is rendered alkaline by addition of sodium hydroxide and extracted with ether. The ether extract is dried over anhydrous potassium carbonate, filtered and evaporated. The residue of β-diethylaminoethyl ester of 2-methyl-bicyclo[2.2.1]-5-heptene-2-carboxylic acid is distilled at about 105–109° C. and 1.5 mm. pressure.

70 parts of the base are dissolved in 3500 parts of anhydrous ether and treated with one equivalent of absolute alcoholic hydrogen chloride. The immediately forming white precipitate is recrystallized from anhydrous ethyl acetate. The hydrochloride thus obtained melts at about 135–137° C.

EXAMPLE 7

*2-methyl-bicyclo[2.2.1]-5-heptene-2-carboxyethyldiethylmethylammonium bromide*

A mixture of 90 parts of the β-diethylaminoethyl ester of 2-methyl-bicyclo[2.2.1]-5-heptene-2-carboxylic acid and 61 parts of methyl bromide in 240 parts of butanone is maintained in a sealed pressure reactor at room temperature. The contents of the reactor solidify within 15 minutes. Recrystallized from a mixture of ethyl acetate and anhydrous 2-propanol, the 2-methyl-bicyclo-[2.2.1] -5- heptene -2- carboxyethyldiethylmethylammonium bromide melts at about 156.5–158° C. It has the structural formula

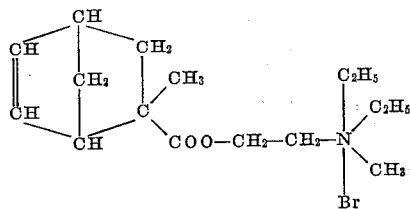

EXAMPLE 8

*γ-(N-morpholino)propyl ester of 2-ethyl-bicyclo-[2.2.1]-5-heptene-2-carboxylic acid*

A mixture of 100 parts of 2-ethyl-bicyclo-[2.2.1]-5-heptene-2-carboxylic acid and 100 parts of N-(γ-chloropropyl)morpholine in 400 parts of absolute 2-propanol is heated at reflux temperature for 10 hours with mechanical stirring. The solvent is stripped off and the solid precipitate dissolved in water. The aqueous solution is washed with ether, rendered alkaline by the addition of dilute sodium hydroxide and extracted with ether. The ether extract is dried over anhydrous calcium sulfate, stirred with decolorizing charcoal, filtered and evaporated. There remains the γ-(N-morpholino)propyl ester of 2-ethyl-bicyclo[2.2.1]-5-heptene-2-carboxylic acid as a clear yellow oil which has the structural formula

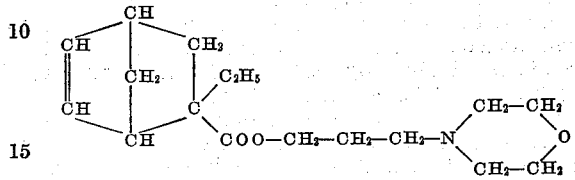

EXAMPLE 9

*β-Diethylaminoethyl ester of 3-methyl-bicyclo-[2.2.1]-5-heptene-2-carboxylic acid*

A mixture of 125 parts of 3-methyl-bicyclo-[2.2.1]-5-heptene-2-carboxylic acid and 120 parts of β-chloroethyldiethylamine in 800 parts of 2-propanol is heated at reflux temperature with stirring for 7 hours. The precipitate is filtered and the mother liquor concentrated to produce an additional precipitate. The combined solids are dissolved in water and the aqueous solution is washed with ether, rendered alkaline by the addition of ammonium hydroxide and extracted with ether. This ether extract is dried over anhydrous potassium carbonate, filtered and evaporated. The β-diethylaminoethyl ester of 3-methyl-bicyclo[2.2.1]-5-heptene-2-carboxylic acid is obtained as an oil which distills at about 100–106° C. and 1–1.2 mm. pressure.

A solution of 100 parts of this base in 3000 parts of anhydrous ether is treated with one equivalent of a solution of hydrogen chloride in absolute alcohol. The immediately forming white precipitate is recrystallized from anhydrous ethyl acetate. The hydrochloride melts at about 118.5–119.5° C.

EXAMPLE 10

*3-methyl-bicyclo[2.2.1]-5-heptene-2-carboxyethyldiethylmethylammonium bromide*

Upon mixing of 135 parts of the β-diethylaminoethyl ester of 3-methyl-bicyclo[2.2.1]-5-heptene-2-carboxylic acid and 87 parts of methyl bromide in 240 parts of butanone and storage at room temperature in a sealed pressure reactor, there occurs formation of a precipitate. This precipitate is collected on a filter and dried. The 3-methyl-bicyclo[2.2.1]-5-heptene - 2 - carboxyethyldiethylmethylammonium bromide is thus obtained as a hygroscopic material melting at about 98–100° C. Treatment of a solution of 3 mols of the bromide in 2-propanol with 1 mol of silver citrate and 2 mols of citric acid by stirring at room temperature, removal of the precipitated silver bromide by filtration and concentration of the filtrate yields the dihydrogen citrate. The cation has the structural formula

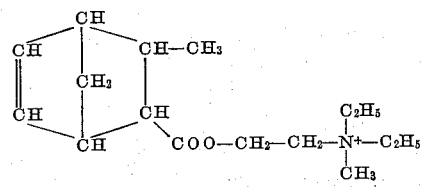

EXAMPLE 11

γ-Diisopropylaminopropyl ester of 3-ethyl-bicyclo[2.2.1]-5-heptene-2-carboxylic acid A mixture of 178 parts of γ-chloropropyldiisopropylamine and 166 parts of 3-ethyl-bicyclo[2.2.1]-5-heptene-2-carboxylic acid in 700 parts of anhydrous propanol is heated with mechanical stirring at reflux temperature for 10 hours, concentrated in vacuum and extracted with water. The aqueous extract is washed with ether and rendered alkaline by addition of dilute sodium hydroxide. The alkaline solution is extracted with ether and the ether extract dried over anhydrous calcium sulfate, stirred with decolorizing charcoal, filtered and evaporated, yielding the γ-diisopropylaminopropyl ester of 3-ethyl-bicyclo[2.2.1]-5-heptene-2-carboxylic acid as a clear orange oil boiling at about 120–124° C. and about 0.5 mm. pressure. It has the structural formula

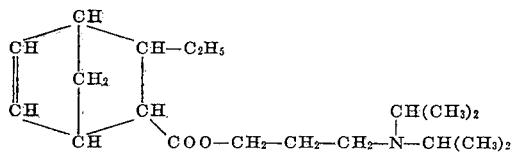

EXAMPLE 12

β-(N-2,6-lupetidino)ethyl ester of 2,3-diethyl-bicyclo[2.2.1]-5-heptene-2-carboxylic acid A mixture of 194 parts of 2,3-diethyl-bicyclo[2.2.1]-5-heptene-2-carboxylic acid and 175 parts of N-(β-chloroethyl)-2,6-lupetidine in 1000 parts of anhydrous 2-propanol is heated at reflux temperature with mechanical stirring for 12 hours and then concentrated. The solid precipitate is extracted with water and the aqueous extract washed with ether and rendered alkaline by the addition of dilute potassium hydroxide. The base is extracted with ether and the ether extract is dried over anhydrous potassium carbonate, stirred with decolorizing charcoal, filtered and evaporated. The resulting β-(N-2,6-lupetidino)-ethyl ester of 2,3-diethyl-bicyclo[2.2.1]-5-heptene-2-carboxylic acid is obtained as a clear amber oil which has the structural formula

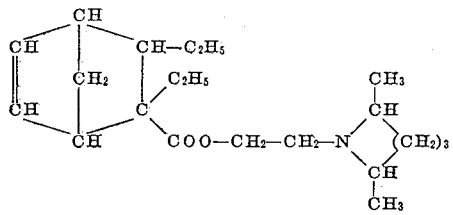

EXAMPLE 13

δ-Dimethylaminobutyl ester of 3,3-dimethyl-bicyclo[2.2.1]-5-heptene-2-carboxylic acid A mixture of 166 parts of 3,3-dimethyl-bicyclo[2.2.1]-5-heptene-2-carboxylic acid and 140 parts of δ-chlorobutyldimethylamine in 800 parts of anhydrous 2-propanol is stirred and heated at reflux temperature for 10 hours, concentrated and extracted with water. The aqueous solution is washed with ether, rendered alkaline by addition of sodium carbonate and extracted with ether. The extract is dried over anhydrous potassium carbonate, stirred with decolorizing charcoal, filtered and evaporated to yield the δ-dimethylaminobutyl ester of 3,3-dimethyl-bicyclo[2.2.1]-5-heptene-2-carboxylic acid as a clear yellowish oil which boils at about 104–106° C. and 0.1 mm. pressure. It has the structural formula

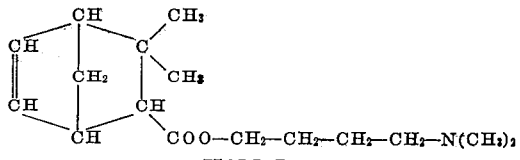

EXAMPLE 14

β-Ethylaminoethyl ester of bicyclo[2.2.2]-5-octene-2-carboxylic acid

A turbinated mixture of 40 parts of the silver salt of bicyclo[2.2.2]-5-octene-2-carboxylic acid and 40 parts of β-chloroethylethylamine in 280 parts of anhydrous toluene is heated for 5 hours under reflux. The reaction mixture is filtered and the filtrate is washed with water and extracted with dilute hydrochloric acid. The extract is washed with ether, made alkaline by addition of dilute sodium hydroxide and extracted with ether. This extract is washed with water, dried over anhydrous calcium sulfate, filtered and evaporated to yield the β-ethylaminoethyl ester of bicyclo[2.2.2]-5-octene-2-carboxylic acid which is distilled at about 80–90° C. and 0.2 mm. pressure.

I claim:

1. A compound of the structural formula

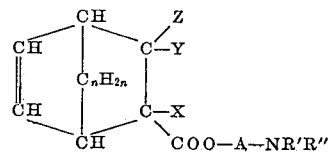

wherein $n$ is a positive integer smaller than 3, X, Y, and Z are members of the class consisting of hydrogen and lower alkyl radicals, A is a lower alkylene radical separating the oxygen and nitrogen atoms attached thereto by at least two carbon atoms, and NR'R'' is a member of the class consisting of lower alkylamino radicals, lower dialkylamino radicals, morpholino radicals and radicals wherein R' and R'' are combined to form a lower alkylene radical containing 4 to 7 carbon atoms.

2. A di-(lower alkyl)aminoalkyl ester of bicyclo[2.2.1]-5-heptene-2-carboxylic acid, wherein the nitrogen atom is removed from the carboxyl radical by a lower alkylene radical containing at least two carbon atoms.

3. A compound of the structural formula

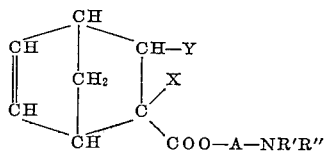

wherein one of the radicals X and Y is a lower alkyl radical and the other a hydrogen radical, A is a saturated lower alkylene radical separating the oxygen and nitrogen atom attached thereto by at least two carbon atoms, and R' and R'' are lower alkyl radicals.

4. A compound of the structural formula

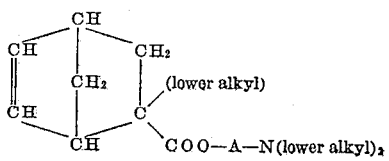

wherein A is a lower alkylene radical separating the nitrogen atom from the carboxyl radical by at least two carbon atoms.

5. A compound of the structural formula

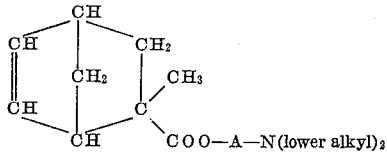

wherein A is a lower alkylene radical separating the nitrogen atom from the carboxyl radical by at least two carbon atoms.

6. β-Diethylaminoethyl ester of 2-methyl-bicyclo[2.2.1]-5-heptene-2-carboxylic acid.

7. A compound of the structural formula

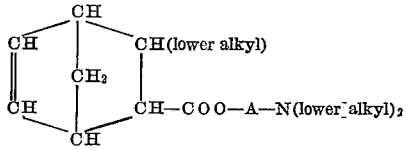

wherein A is a lower alkylene radical separating the nitrogen atom from the carboxyl radical by at least two carbon atoms.

8. A compound of the structural formula

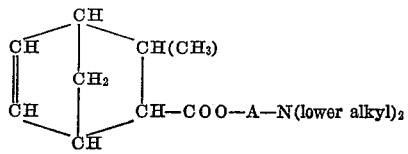

wherein A is a lower alkylene radical separating the nitrogen atom from the carboxyl radical by at least two carbon atoms.

9. β-Diethylaminoethyl ester of 3-methyl-bicyclo[2.2.1]-5-heptene-2-carboxylic acid.

10. A compound of the structural formula

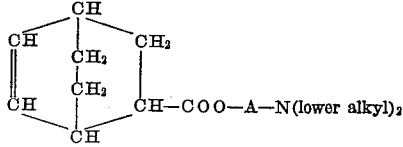

wherein A is a lower alkylene radical separating the nitrogen atom from the carboxyl radical by at least two carbon atoms.

11. β-Dimethylaminoethyl ester of bicyclo-[2.2.2]-5-octene-2-carboxylic acid.

12. A compound of the structural formula

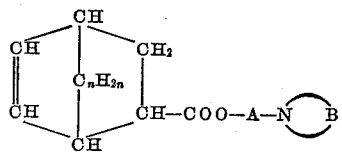

wherein $n$ is a positive integer smaller than 3, A is a lower alkylene radical separating the oxygen and nitrogen atom attached thereto by at least two carbon atoms, and B is an alkylene radical containing 4 to 7 carbon atoms.

No references cited.